US 8,147,237 B2

(12) United States Patent
Jenko et al.

(10) Patent No.: US 8,147,237 B2
(45) Date of Patent: Apr. 3, 2012

(54) HOT RUNNER SYSTEM HAVING ACTIVE MATERIAL

(75) Inventors: Edward Joseph Jenko, Essex, VT (US); James Osborne Plumpton, Enosburg Falls, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 51 days.

(21) Appl. No.: 12/988,634

(22) PCT Filed: May 19, 2009

(86) PCT No.: PCT/US2009/044477
§ 371 (c)(1),
(2), (4) Date: Oct. 20, 2010

(87) PCT Pub. No.: WO2009/146273
PCT Pub. Date: Dec. 3, 2009

(65) Prior Publication Data
US 2011/0033572 A1    Feb. 10, 2011

(51) Int. Cl.
B29C 45/20    (2006.01)
(52) U.S. Cl. .......... 425/549; 425/562; 425/572
(58) Field of Classification Search .......... 425/549, 425/562, 563, 564, 565, 566, 572
See application file for complete search history.

(56) References Cited

U.S. PATENT DOCUMENTS

| 4,017,237 | A | 4/1977 | Webster |
| 4,120,921 | A | 10/1978 | Webster |
| 6,343,925 | B1 | 2/2002 | Jenko |
| 7,072,735 | B2 | 7/2006 | Smith |
| 7,874,833 | B2 * | 1/2011 | Kaushal .......... 425/549 |
| 7,883,333 | B2 * | 2/2011 | Watanabe et al. ......... 425/564 |
| 2005/0236729 | A1 | 10/2005 | Arnott |
| 2005/0255187 | A1 * | 11/2005 | Kazmer .......... 425/563 |
| 2007/0108662 | A1 | 5/2007 | Jenko |
| 2008/0012167 | A1 | 1/2008 | Arnott |

* cited by examiner

Primary Examiner — Timothy Heitbrink

(57) ABSTRACT

According to an aspect, there is disclosed a hot runner system (100), comprising: a first surface (205) being elastically deformable; a second surface (210) forming, in cooperation with the first surface (205), a melt-leakage gap (215) being located between the first surface (205) and the second surface (210); and an active material (220) being: (i) coupled with the first surface (205), (ii) held normally stationary, (iii) configured to be operatively coupled with a signal source (225), and (iv) configured to elastically deform in response to receiving a signal from the signal source (225), upon elastic deformation of the active material (220), the first surface (205) becomes moved toward the second surface (210) such that a size (235) of the melt-leakage gap (215) becomes controlled.

13 Claims, 5 Drawing Sheets

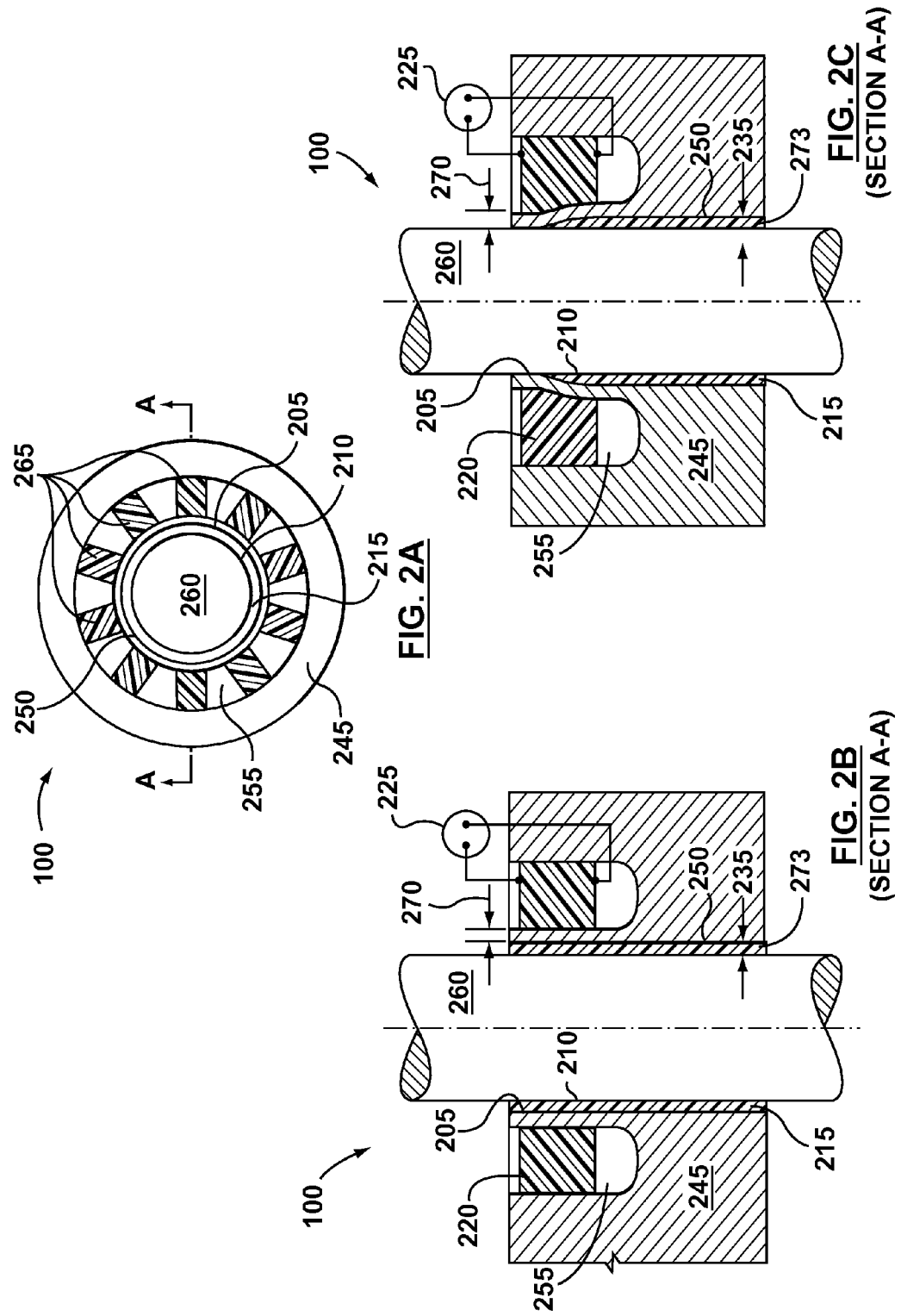

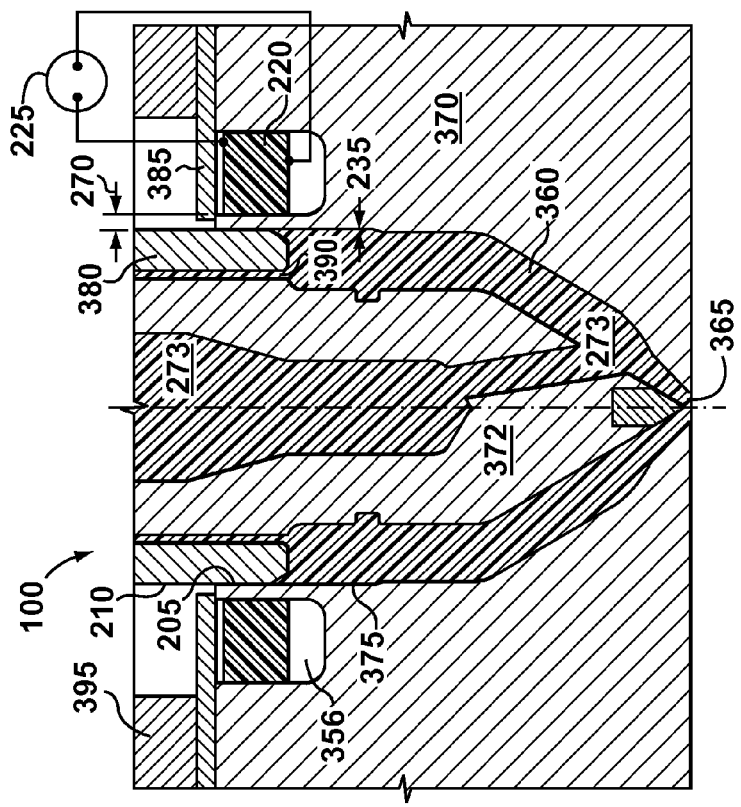
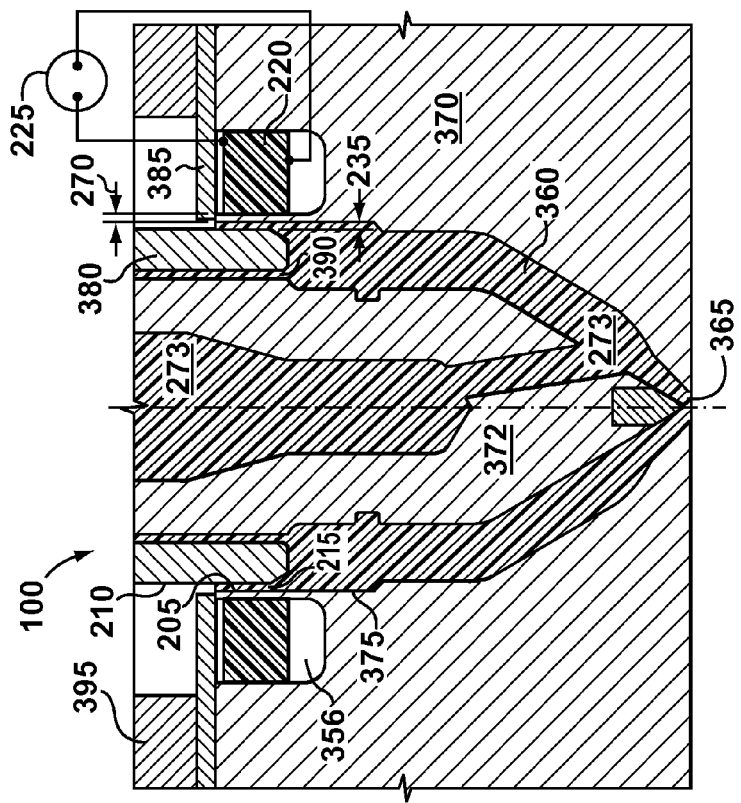
FIG. 3A
FIG. 3B

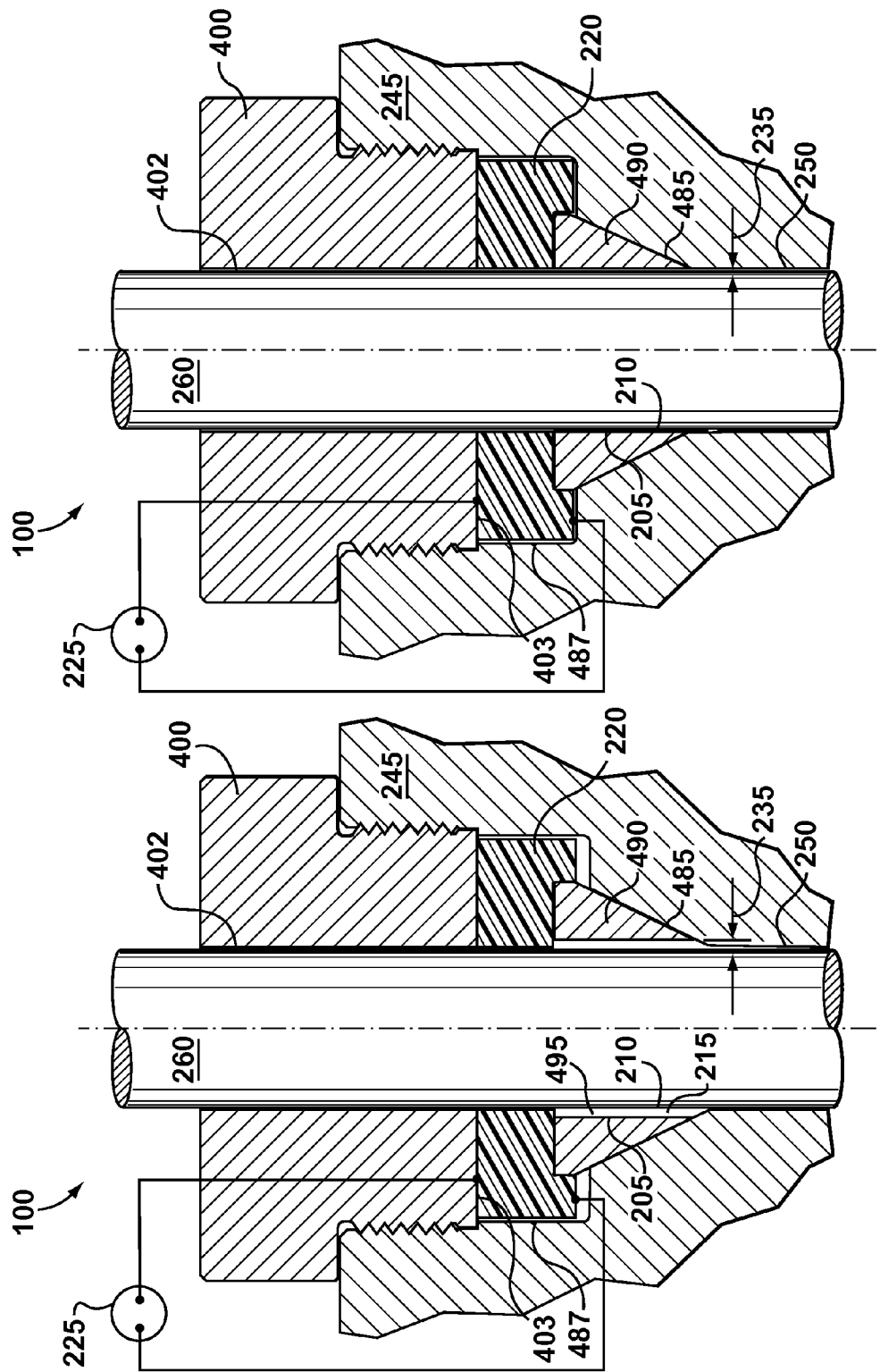

HOT RUNNER SYSTEM HAVING ACTIVE MATERIAL

TECHNICAL FIELD

The present invention generally relates to molding systems, and more specifically the present invention relates to hot runners and molding systems having hot runners.

BACKGROUND OF THE INVENTION

U.S. Pat. No. 4,017,237 (Inventor: WEBSTER; Published: Apr. 12, 1977) discloses a mold provided with a pair of cavities interconnected by a runner to a common entry point. One of the cavities is gated whereby plastic may be injected into this cavity only by applying ultrasonic energy to the gate.

U.S. Pat. No. 4,120,921 (Inventor: WEBSTER; Published: Oct. 17, 1978) discloses a mold provided with a pair of cavities interconnected by a runner to a common entry point. One of the cavities is gated whereby plastic may be injected into this cavity only by applying ultrasonic energy to the gate.

U.S. Pat. No. 7,072,735 B2 (Inventor: SMITH; Published: Jul. 4, 2006) discloses a method and apparatus for controlling an injection molding machine having a first surface and a second surface including a piezo-ceramic sensor configured to be disposed between the first and second surface. The piezo-ceramic sensor is configured to sense a force between the first surface and the second surface, and to generate corresponding sense signals. Transmission structure is coupled to the piezo-ceramic sensor and is configured to carry the sense signals. Preferably, a piezo-ceramic actuator is also disposed between the first surface and a second surface, and is configured to provide an expansive force between the first surface and a second surface in accordance with the sense signals.

U.S. Pat. No. 7,165,958 B2 (Inventor: JENKO; Published: Jan. 23, 2007) discloses a method and apparatus provided for sealing interfaces within an injection mold having a first surface and a second surface including an active material actuator configured to be disposed in a manner suitable for generating a force between the first surface and the second surface. The active material actuator is configured to generate a force in response to sense signals from a transmission structure. Methods and apparatus are also provided for centering a nozzle tip within a gate opening, and adjusting tip height of a nozzle tip with respect to a gate opening, also using active material inserts.

U.S. Pat. No. 7,293,981 B2 (Inventor: NIEWELS; Published: Nov. 13, 2007) discloses a method and apparatus for compressing melt and/or compensating for melt shrinkage in an injection mold are provided. The apparatus includes a cavity mold portion adjacent a cavity plate, a core mold portion adjacent a core plate, a mold cavity formed between the mold portions, and at least one piezo-ceramic actuator disposed between either or both of the core plate and the core mold portion and the cavity plate and the cavity mold portion. A controller may be connected to the at least one piezo-ceramic actuator to activate it, thereby causing the mold cavity volume to decrease, compressing the melt.

United States Patent Application Publication Number 2005/0236725 A1 (Inventor: NIEWELS et al; Published: Oct. 27, 2005) discloses a method and apparatus for controlling an injection mold having a first surface and a second surface including an active material element configured to be disposed between the first surface and a second surface. The active material element may be configured to sense a force between the first surface and the second surface, and to generate corresponding sense signals. Transmission structure is coupled to the active material element and is configured to carry the sense signals. Preferably, an active material element actuator is also disposed between the first surface and a second surface, and is configured to provide an expansive force between the first surface and a second surface in accordance with the sense signals. The method and apparatus may be used to counter undesired deflection an/or misalignment in an injection mold.

United States Patent Application Publication Number 2005/0236726 A1 (Inventor: NIEWELS; Published: Oct. 27, 2005) discloses a method and apparatus for controlling a vent gap in a mold for an injection molding machine are provided, and include an active material insert configured to regulate the degree of opening of the vent gap. The active material insert is configured to be actuated in response to signals from a controller, so as to selectively block the opening of the vent gap during the molding process. Wiring structure is coupled to the active material insert, and is configured to carry the actuation signals. Melt flow sensors may also be provided to aid in regulating the vent gap, and may be connected to the controller in order to provide real-time closed loop control over the operation of the vent gap. Preferably, the methods and apparatus are used as part of a system for controlling the flow of melt within a mold cavity.

United States Patent Application Publication Number 2005/0236727 A1 (Inventor: NIEWELS; Published: Oct. 27, 2005) discloses a method and apparatus for applying a force to a portion of a surface of a mold component are provided. An injection mold has a core insert, a side acting core insert, and a piezo-ceramic actuator. The amount of force needed for sealing a surface of said side acting core insert to a portion of a surface of said core insert is determined, and a piezo-ceramic actuator is actuated so as to supply the force to seal the side acting core insert against the core insert during a molding operation. A piezo-ceramic sensor may be provided to sense a force between the side acting core insert an the core insert, and to generate corresponding sense signals. Wiring structure is coupled to the piezo-ceramic sensor and is configured to carry the sense signals.

United States Patent Application Publication Number 2005/0236729 A1 (Inventor: ARNOTT; Published: Oct. 27, 2005) discloses a method and apparatus for applying a vibration and/or oscillation to melt within an injection mold including at least one stable surface within the mold, at least one movable surface within the mold, at least one active material element affixed to each stable surface, and adjacent to each movable surface. In use, a control means repeatedly energizes the at least on active material element, wherein the repeated energizing of the at least one active material element generates vibration and/or oscillation in the melt. In the method, at least one active material element is activated intermittently to move the at least one movable surface with respect to the at least one fixed surface. In the apparatus, a wiring conduit is coupled to the active material insert, and is configured to carry vibration signals to the at least one active material element.

United States Patent Application Publication Number 2005/0238757 A1 (Inventor: NIEWELS et al; Published: Oct. 27, 2005) discloses a method and apparatus for assisting the ejection of molded parts from a mold having a first surface and a second surface including an active material actuator configured to be disposed between the first surface and a second surface. The active material actuator is configured to provide an expansive force between the first surface and the second surface in response to actuation signals, pushing the surfaces apart. Transmission structure is coupled to the active material actuator and is configured to transmit the actuation signals. The molded part may be ejected upon initiation of the actuation signal, or upon withdrawal of the actuation signal.

SUMMARY OF THE INVENTION

According to a first aspect of the present invention, there is provided a hot runner system (100), comprising: a first surface (205) being elastically deformable; a second surface (210) forming, in cooperation with the first surface (205), a melt-leakage gap (215) being located between the first surface (205) and the second surface (210); and an active material (220) being: (i) coupled with the first surface (205), (ii) held normally stationary, (iii) configured to be operatively coupled with a signal source (225), and (iv) configured to elastically deform in response to receiving a signal from the signal source (225), upon elastic deformation of the active material (220), the first surface (205) becomes moved toward the second surface (210) such that a size (235) of the melt-leakage gap (215) becomes controlled.

According to a second aspect of the present invention, there is provided a molding system (500), comprising: a hot runner system (100), including: a first surface (205); a second surface (210) forming, in cooperation with the first surface (205), a melt-leakage gap (215) being located between the first surface (205) and the second surface (210); a signal source (225); and an active material (220) being coupled with the first surface (205), the active material (220) being configured to be coupled with the signal source (225), and the active material (220) being configured to, in response to receiving a signal from the signal source (225), move the first surface (205) toward the second surface (210) such that a size (235) of the melt-leakage gap (215) may be controlled at a position being located proximate to the active material (220).

A technical effect of the aspects of the present invention is provision of a seal between hot runner components in a hot runner system 100 to control and/or to prevent the leakage of melt in a melt leakage gap 215 being located between two adjacent surfaces by way of using an active material 220.

BRIEF DESCRIPTION OF THE DRAWINGS

A better understanding of the exemplary embodiments of the present invention (including alternatives and/or variations thereof) may be obtained with reference to the detailed description of the exemplary embodiments of the present invention along with the following drawings, in which:

FIGS. 2A, 2B and 2C depict views of the hot runner system 100 of FIG. 1 in accordance with a first non-limiting embodiment;

FIGS. 3A and 3B depict cross-sectional views of the hot runner system 100 in accordance with a second non-limiting embodiment;

FIGS. 4A and 4B depict cross-sectional views of the hot runner system 100 in accordance with a third non-limiting embodiment.

The drawings are not necessarily to scale and are sometimes illustrated by phantom lines, diagrammatic representations and fragmentary views. In certain instances, details that are not necessary for an understanding of the embodiments or that render other details difficult to perceive may have to been omitted.

DETAILED DESCRIPTION OF THE PREFERRED EMBODIMENT(S)

Figure 1:
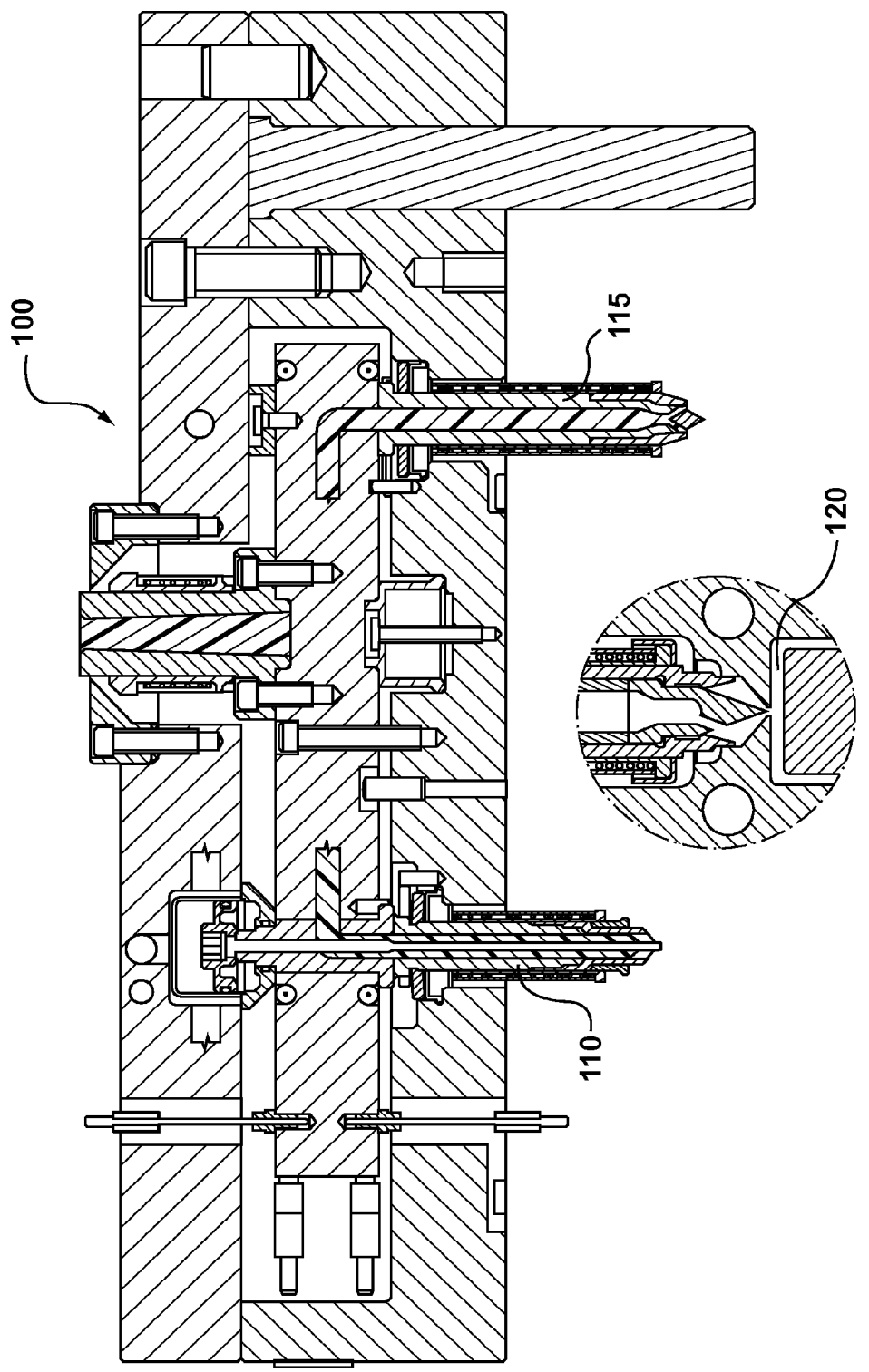
FIG. 1 depicts the cross-sectional view of the hot runner system 100.
Figure 5:
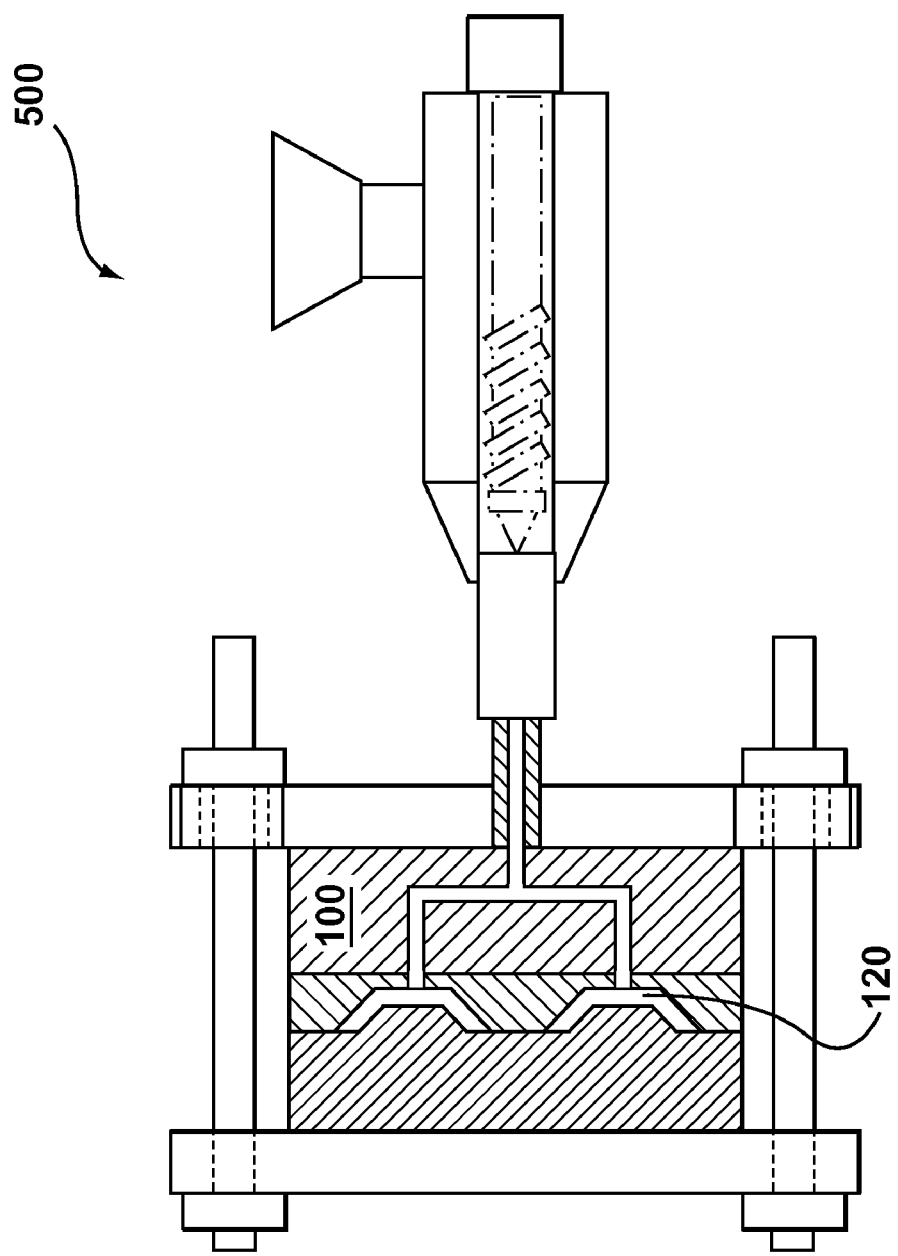
FIG. 5 depicts a molding system 500 having any one of the hot runner systems 100 of FIGS. 1 to 4B (inclusive).

FIG. 1 depicts the cross-sectional view of the hot runner system 100. By way of example, the hot runner system 100 has a nozzle, such as a valve gate nozzle 110 and/or a thermal gate nozzle 115 connected with the hot runner system 100 and a mold 120. The hot runner system 100 is used in a molding system 500, which is depicted in FIG. 5. It will be appreciated that the hot runner system 100 (and the molding system 500) may include components that are known to persons skilled in the art, and these known components will not be described here; these known components are described, at least in part, in the following text books (by way of example): (i) "*Injection Molding Handbook*" by Osswald/Turng/Gramann (ISBN: 3-446-21669-2; publisher: Hanser), (ii) "*Injection Molding Handbook*" by Rosato and Rosato (ISBN: 0-412-99381-3; publisher: Chapman & Hill), (iii) "*Runner and Gating Design Handbook*" by John P. Beaumont (ISBN 1-446-22672-9, publisher: Hanser), and/or (iv) "*Injection Molding Systems*" $3^{rd}$ Edition by Johannaber (ISBN 3-446-17733-7).

FIGS. 2A, 2B and 2C depict the views of the hot runner system 100 of FIG. 1. Referring to FIGS. 2B and 2C, the hot runner system 100 includes: (i) a first surface 205, (ii) a second surface 210, and (iii) an active material 220. The first surface 205 is elastically deformable. The second surface 210 forms, in cooperation with the first surface 205, a melt-leakage gap 215 located between the first surface 205 and the second surface 210. The active material 220 is: (i) coupled with the first surface 205, (ii) held normally stationary, (iii) configured to be operatively coupled with a signal source 225, and (iv) configured to elastically deform in response to receiving a signal from the signal source 225. Upon elastic deformation of the active material 220, the first surface 205 becomes moved toward the second surface 210 such that a size 235 of the melt-leakage gap 215 becomes controlled.

The active material 220 may include, by way of example, a piezoelectric material and/or a piezoelectric crystal, such as (but not limited to) berlinite (AlPO4), quartz (SiO2), topaz, tourmaline, gallium othophospate (GaPO4), Langasite (La3Ga5SiO14) or a piezoelectric ceramic such as barium titanate (BaTiO3), lead titanate (PbTiO3), lead zirconate titanate (PZT), potassium niobate (KNbO3), lithium niobate (LiNbO3), lithium tantalite (LiTaO3), sodium tungstate (NaWO3), BaNaNb5O5, or Pb2KNb5O15, or other materials such as zinc oxide (ZnO), aluminum nitride (AlN) or polyvinylidene fluoride (PVDF), etc. Various piezoelectric manufacturers may be used to source the active material 220 such as (by way of example); (i) APC International Ltd., U.S.A., Phone: 570-726-6961, (ii) CeramTec AG, Germany, Phone: +49 (0)7153/6 11-0, (iii) Kinetic Ceramics, Inc., U.S.A., Phone: 510.264.2140, (iv) Materials Systems Inc., U.S.A., Phone: 978-486-0404, (v) Murata Electronics North America, Inc., U.S.A., Phone: 770-436-1300, (vi) Sparkler Ceramics Pvt. Ltd, India, Phone: 91-20-2747 2375, or (vii) TRS Technologies, U.S.A., Phone: 814-238-7485.

While the typical mechanism of the piezoelectric material is the application of a mechanical stress to generate a voltage across the material, piezoelectric materials also show the opposite effect, called 'converse piezoelectric effect', whereby the application of an electric field, or a signal, from the signal source 225, creates mechanical deformation in the piezoelectric material. It is this converse piezoelectric effect of an active material 220 which is used to enable the embodiments of the aspects of the present invention.

Referring to FIG. 2B, a manifold bushing 245 has a bushing hole 250 extending through the manifold bushing 245 and the bushing hole 250 receives a valve stem 260. The manifold bushing 245 also has a bushing groove 255 encircling, at least in part, the bushing hole 250, and the active material 220 is received in the bushing groove 255.

The first surface 205, which is an integral part of the manifold bushing 245, faces the second surface 210. The first surface 205 is made elastically deformable due to the proximate placement of the bushing groove 255 to the melt-leakage gap 215, thereby creating an annular wall 270 therebetween. The annular wall 270 is sufficiently thin to allow flexure of the annular wall 270 between the bushing groove 255 and the first surface 205. The manifold bushing 245 includes an alloy which is described further below.

The size 235 of the melt-leakage gap 215 may be variable and is determined by the amount of movement of the active material 220 and hence the amount of movement of the first surface 205 toward the second surface 210.

The second surface 210 is the outer surface of a valve stem 260 which is configured to reciprocate within a bushing hole 250 that is defined by the bushing groove 255 so that the second surface 210 moves relative to the first surface 205. The bushing hole 250 extends through the manifold bushing 245. The bushing groove 255 is defined on a top side or top face of the manifold bushing 245, and it will be appreciated that the bushing groove 255 may be defined on a bottom side or a bottom face of the manifold bushing 245.

FIG. 2B depicts the active material 220 in a non-active state, while FIG. 2C depicts the active material 220 in an active state. Referring to FIG. 2C, the active material 220 is configured, in response to receiving the signal from the signal source 225, to urge the first surface 205 toward the second surface 210 so that the first surface 205 seals (and makes contact with) with the second surface 210 thereby preventing a flow of a melt 273 along the melt-leakage gap 215, as shown in FIG. 2C.

It will be appreciated that the size 235 of the melt-leakage gap 215 between the first surface 205 relative to the second surface 210 may result in partial closure, when the active material 220 receives the signal from the signal source 225. For the case where the active material 220 is in the non-active state, the size 235 of the melt-leakage gap 215 is preferably no greater than 0.1 mm, to preclude excessive flexure of the annular wall 270. For the case where the active material 220 is in the active state, the size 235 of the melt-leakage gap 215 is preferably no less than 0 mm, for a size-on-size fit (no gap) between the first surface 205 and the second surface 210.

According to a non-limiting variant, the active material 220 is configured to, in response to receiving the signal from the signal source 225, urge the first surface 205 toward the second surface 210 so that the first surface 205 remains offset from the second surface 210 thereby varying an amount of a flow of a melt 273 along the melt-leakage gap 215.

FIG. 2A depicts the active material 220 as it is arranged (by way of example in accordance with a non-limiting variant) in an active material array 265 in the bushing groove 255. The active material array 265 includes a plurality of active material 220. When the active material array 265 receives the signal, the active material array 265 exerts forces along radial directions of a valve stem 260 relative to a longitudinal axis of a valve stem 260, so that the force extends from the first surface 205 toward the second surface 210 in a more or less substantially uniform manner.

To facilitate elastic deformation of the first surface 205, the manifold bushing 245 is made from a material (or an alloy) which may include, by way of example, a variety of high strength steel alloys, such as (but not limited to) H-13. The annular wall 270 is preferably no less than 0.5 mm thick, to preclude fracture of the wall, and preferably no greater than 3.0 mm thick, to permit elastic flexure of the wall in response to activation of the active material 220.

The signal source 225 is capable of supplying a high voltage (low current) source of electricity to the active material 220. According to a non-limiting variant, timing of the signal source 225 may be tied into the molding cycle of the injection molding machine, such that the following sequence may be observed: (i) the valve stem 260 opens flow path into the mold 120, (ii) the active material 220 moves toward the valve stem 260 creating a seal, (iii) the plastic injection pressure is increased to fill and pack the mold 120 (iv) the plastic injection pressure is decreased (v) the active material 220 relaxes, releasing hold of valve stem 260, and (vi) the valve stem 260 closes flow path into mold 120.

The exact timing of this sequence may be altered according to the molding application, however, it is likely that the valve stem 260 may not be opened or closed with the active material 220 activated. While this sequence may incur some cycle time penalty, active materials 220 react extremely quickly to an applied voltage, and thus it is expected that any impact on cycle time would be minimal.

According to a non-limiting variant, a seal is not created between the first surface 205 and the second surface 210, but rather a permitted amount of bleeding of the melt 273 from the melt-leakage gap 215 may be desired. By way of example, a valve gate nozzle 110 requires a thin film of lubrication between the first surface 205 and the second surface 210, in the form of the melt 273, to prevent seizure of the valve stem 260 in the bushing hole 250.

FIGS. 3A and 3B depict the hot runner system 100 according to the second non-limiting embodiment. The second surface 210 is (an outer surface of) an integral part of a nozzle 380, and the first surface 205 is integral to a gate insert 370. A nozzle tip 372, in fluid communication with the nozzle 380, permits a melt 273 to flow out of the hot runner system 100 and into a gate bubble 360 of the gate insert 370 and ultimately exit through a gate 365. The melt 273 is also allowed to flow into a gap 390 between the nozzle 380 and the nozzle tip 372 to act as an insulative layer to minimize thermal conduction therebetween.

The gate insert 370 has a nozzle bore 375 extending into the gate insert 370. The nozzle bore 375 receives the nozzle 380. The gate insert 370 also has a gate insert groove 356 which receives the active material 220 in the form of the active material array 265, (which is depicted in FIG. 2A). The active material array 265 is held in place in the gate insert groove 356 via a cover 385. The cover 385 is, in turn, secured against the gate insert 370 by the proximity of a manifold plate 395.

FIG. 3A depicts the active material 220 in a non-energized state such that the melt-leakage gap 215 exists between the first surface 205 and the second surface 210. When the active material array 265 receives the signal, the active material array 265 imparts a force along a direction extending radially from a longitudinal axis of a nozzle 380 to control the size 235 of the melt-leakage gap 215, as shown in FIG. 3B (FIG. 3B depicts the active material 220 in an energized state). The size 235 of the melt-leakage gap 215 is preferably no greater than 0.1 mm, to preclude excessive flexure of the annular wall 270 and preferably no less than 0 mm, for a size-on-size fit (no gap) between the first surface 205 and the second surface 210.

To facilitate elastic deformation of the first surface 205, the gate insert 370 is made from a material which may include, by way of example, a variety of gate insert materials known to those skilled in the art, such as (but not limited to) H-13. The thickness of the annular wall 270 is preferably no less than 0.5 mm, to preclude fracture, and preferably no greater than 3.0 mm, to permit elastic flexure.

FIGS. 4A and 4B depicts the hot runner system 100 according to the third, non-limiting embodiment. The second surface 210 is the outer surface of the valve stem 260. The second surface 210 is configured to reciprocate within the bushing hole 250, and the first surface 205, which is the inner surface of a wedge seal hole 495. The wedge seal 490 has a wedge seal hole 495 extending through the wedge seal 490, for receiving the valve stem 260. The wedge seal 490 is also engaged in a bushing cavity 485 of the manifold bushing 245. The wedge seal 490 is made from a material which may include, by way of example, a variety of high strength steel alloys, such as (but not limited to) H-13 and CPM9V, or high temperature thermoset/thermoplastic materials such as (but not limited to) polyimides or Celazole® Polybenzimidazole.

A positioning nut 400 is configured to threadably engage with the manifold bushing 245 to secure and locate the active material 220, and the positioning nut 400 also has a positioning nut hole 402 therethrough for reciprocating movement of the valve stem 260. The positioning nut 400 is made from a material which may include, by way of example, a variety of high strength steel alloys, such as (but not limited to) H-13 and CPM9V. A bushing bore 487 is centrally located in the manifold bushing 245 to house the active material 220, and a bearing surface 403 of the positioning nut 400 is configured to secure and locate the active material 220 atop the wedge seal 490 located in the bushing cavity 485.

FIG. 4A depicts the active material 220 and the wedge seal 490 in a non-energized state, whereby the size 235 of the melt-leakage gap 215 is at a maximum. Conversely, FIG. 4B depicts the active material 220 having received the signal from the signal source 225 such that the size 235 of the melt-leakage gap 215 is reduced. The deformation of the active material 220 forces the wedge seal 490 into the confined space of the bushing cavity 485 thereby deforming the wedge seal 490 such that the wedge seal hole 495 is constricted around the valve stem 260 thus controlling the size 235 of the melt-leakage gap 215.

FIG. 5 depicts a schematic representation of the molding system 500, which includes any one of the hot runner systems 100 of FIGS. 1 to 4B, inclusive, and a mold 120.

The description of the non-limiting embodiments provides non-limiting examples of the present invention; these non-limiting examples do not limit the scope of the claims of the present invention. The non-limiting embodiments described are within the scope of the claims of the present invention. The non-limiting embodiments described above may be: (i) adapted, modified and/or enhanced, as may be expected by persons skilled in the art, for specific conditions and/or functions, without departing from the scope of the claims herein, and/or (ii) further extended to a variety of other applications without departing from the scope of the claims herein. It is understood that the non-limiting embodiments illustrate the aspects of the present invention. Reference herein to details and description of the non-limiting embodiments is not intended to limit the scope of the claims of the present invention. Other non-limiting embodiments, which may not have been described above, may be within the scope of the appended claims. It is understood that: (i) the scope of the present invention is limited by the claims, (ii) the claims themselves recite those features regarded as essential to the present invention, and (ii) preferable embodiments of the present invention are the subject of dependent claims. Therefore, what is protected by way of letters patent are limited only by the scope of the following claims:

What is claimed is:

1. A hot runner system (100), comprising:
a first surface (205) being elastically deformable;
a second surface (210) forming, in cooperation with the first surface (205), a melt-leakage gap (215) being located between the first surface (205) and the second surface (210); and
an active material (220) being: (i) coupled with the first surface (205), (ii) held normally stationary, (iii) configured to be operatively coupled with a signal source (225), and (iv) configured to elastically deform in response to receiving a signal from the signal source (225), upon elastic deformation of the active material (220), the first surface (205) becomes moved toward the second surface (210) such that a size (235) of the melt-leakage gap (215) becomes controlled.

2. The hot runner system (100) according to claim 1, wherein:
the active material (220) is configured to, in response to receiving the signal from the signal source (225), urge the first surface (205) toward the second surface (210) so that the first surface (205) seals with the second surface (210) thereby preventing a flow of a melt (273) along the melt-leakage gap (215).

3. The hot runner system (100) according to claim 1, wherein:
the size (235) of the melt-leakage gap (215) between the first surface (205) relative to the second surface (210) results in partial closure, when the active material (220) receives the signal from the signal source (225).

4. The hot runner system (100) according to claim 1, wherein:
the active material (220) is configured to, in response to receiving the signal from the signal source (225), urge the first surface (205) toward the second surface (210) so that the first surface (205) remains offset from the second surface (210) thereby varying an amount of a flow of a melt (273) along the melt-leakage gap (215).

5. The hot runner system (100) according to claim 1, wherein:
the second surface (210) includes:
a valve stem (260) being configured to reciprocate; and
the first surface (205) includes:
a manifold bushing (245) defining a bushing hole (250) extending through the manifold bushing (245), and the bushing hole (250) receiving the valve stem (260).

6. The hot runner system (100) according to claim 1, wherein:
the second surface (210) includes:
a valve stem (260) being configured to reciprocate; and
the first surface (205) includes:
a manifold bushing (245) defining a bushing hole (250) extending through the manifold bushing (245), the bushing hole (250) receiving the valve stem (260), the manifold bushing (245) defining a bushing groove (255) encircling, at least in part, the bushing hole (250), and the active material (220) being received in the bushing groove (255).

7. The hot runner system (100) according to claim 1, wherein:
the active material (220) includes an active material array (265), and a bushing groove (255) receives the active material array (265), and once the active material array (265) receives the signal, the active material array (265) exerts a force along a radial direction relative to a longitudinal axis of a valve stem (260), so that the force extends from the first surface (205) toward the second surface (210).

8. The hot runner system (100) according to claim 1, wherein:
the second surface (210) includes:
a nozzle (380); and
the first surface (205) includes:
a gate insert (370), defining a nozzle bore (375) extending through the gate insert (370), and the nozzle bore (375) receives the nozzle (380).

9. The hot runner system (100) according to claim 1, wherein:
the second surface (210) includes:
a nozzle (380); and
the first surface (205) includes:
a gate insert (370), defining a nozzle bore (375) extending through the gate insert (370), and the nozzle bore (375) receives the nozzle (380),
the active material (220) includes:
an active material array (265), and the gate insert (370) defines a gate insert groove (356) being configured to receive the active material array (265) such that once the active material array (265) receives the signal, the active material array (265) imparts a force along a direction extending radially from a longitudinal axis of the nozzle (380).

10. The hot runner system (100) according to claim 1, wherein:
the second surface (210) includes:
a valve stem (260) being configured to reciprocate; and
the first surface (205) includes:
a wedge seal (490) defining a wedge seal hole (495) extending through the wedge seal (490), the wedge seal hole (495) for receiving the valve stem (260) having the second surface (210).

11. The hot runner system (100) according to claim 10, wherein:
the wedge seal (490) is engaged with a bushing cavity (485) of a manifold bushing (245).

12. The hot runner system (100) according to claim 10, further comprising:
a positioning nut (400) being configured to threadably engage with a manifold bushing (245) to secure and locate the active material (220), the positioning nut (400) including:
a positioning nut hole (402) therethrough for reciprocating movement of the valve stem (260),
a bushing bore (487) to house the active material (220), and
a bearing surface (403) being configured to secure and locate the active material (220) atop the wedge seal (490) being located within a bushing cavity (485).

13. A molding system (500), comprising:
a hot runner system (100), including:
a first surface (205);
a second surface (210) forming, in cooperation with the first surface (205), a melt-leakage gap (215) being located between the first surface (205) and the second surface (210);
a signal source (225); and
an active material (220) being coupled with the first surface (205), the active material (220) being configured to be coupled with the signal source (225), and the active material (220) being configured to, in response to receiving a signal from the signal source (225), move the first surface (205) toward the second surface (210) such that a size (235) of the melt-leakage gap (215) may be controlled at a position being located proximate to the active material (220).

\* \* \* \* \*